No. 646,948. Patented Apr. 10, 1900.
H. M. BROOKFIELD & S. KRIBS.
PRESS FOR MOLDING INSULATORS.
(Application filed May 7, 1898.)

(No Model.) 10 Sheets—Sheet 1.

Fig. 1,

WITNESSES:

INVENTORS
Henry M. Brookfield,
Seraphin Kribs,
BY
ATTORNEYS.

No. 646,948. Patented Apr. 10, 1900.
H. M. BROOKFIELD & S. KRIBS.
PRESS FOR MOLDING INSULATORS.
(Application filed May 7, 1898.)
(No Model.) 10 Sheets—Sheet 3.

No. 646,948. Patented Apr. 10, 1900.
H. M. BROOKFIELD & S. KRIBS.
PRESS FOR MOLDING INSULATORS.
(Application filed May 7, 1898.)
(No Model.) 10 Sheets—Sheet 4.
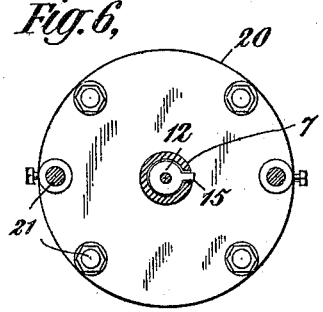
Fig. 6.
Fig. 7.
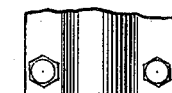
Fig. 4.
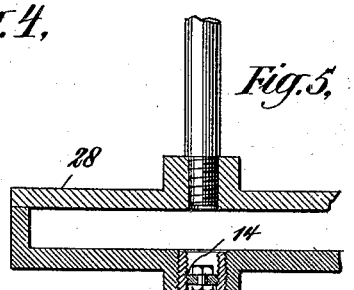
Fig. 5.
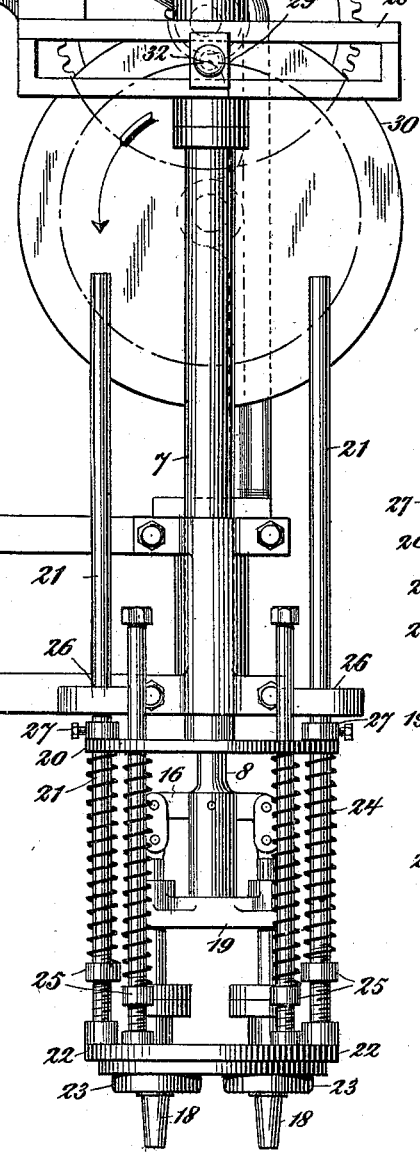
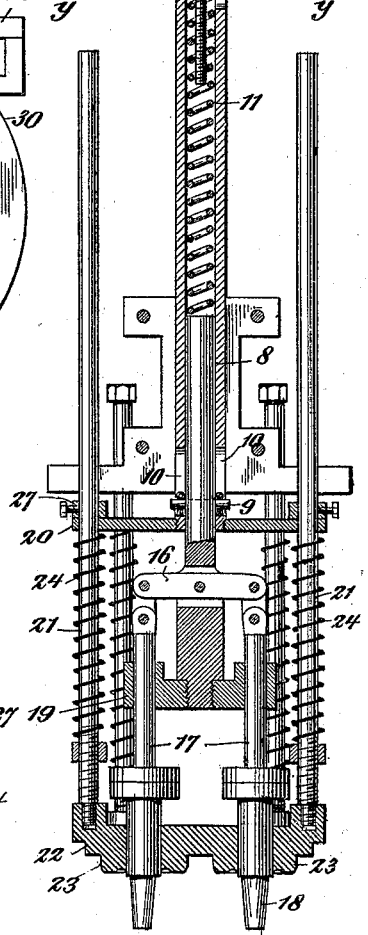
WITNESSES:
Edwin Segers
Jas. E. Howell
INVENTORS
Henry M. Brookfield
Seraphin Kribs,
BY
Witter Kenyon
ATTORNEYS No. 646,948. Patented Apr. 10, 1900.
H. M. BROOKFIELD & S. KRIBS.
PRESS FOR MOLDING INSULATORS.
(Application filed May 7, 1898.)
(No Model.) 10 Sheets—Sheet 5.
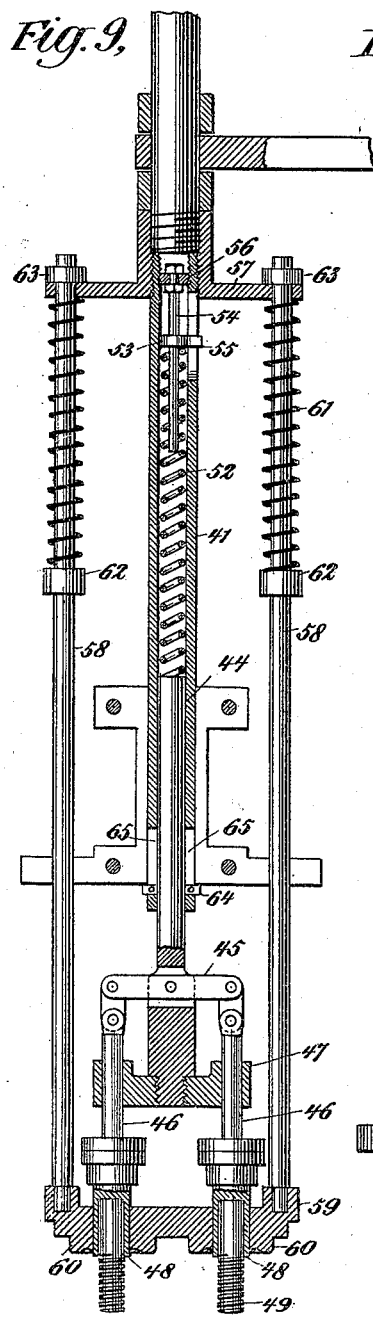
Fig. 9,
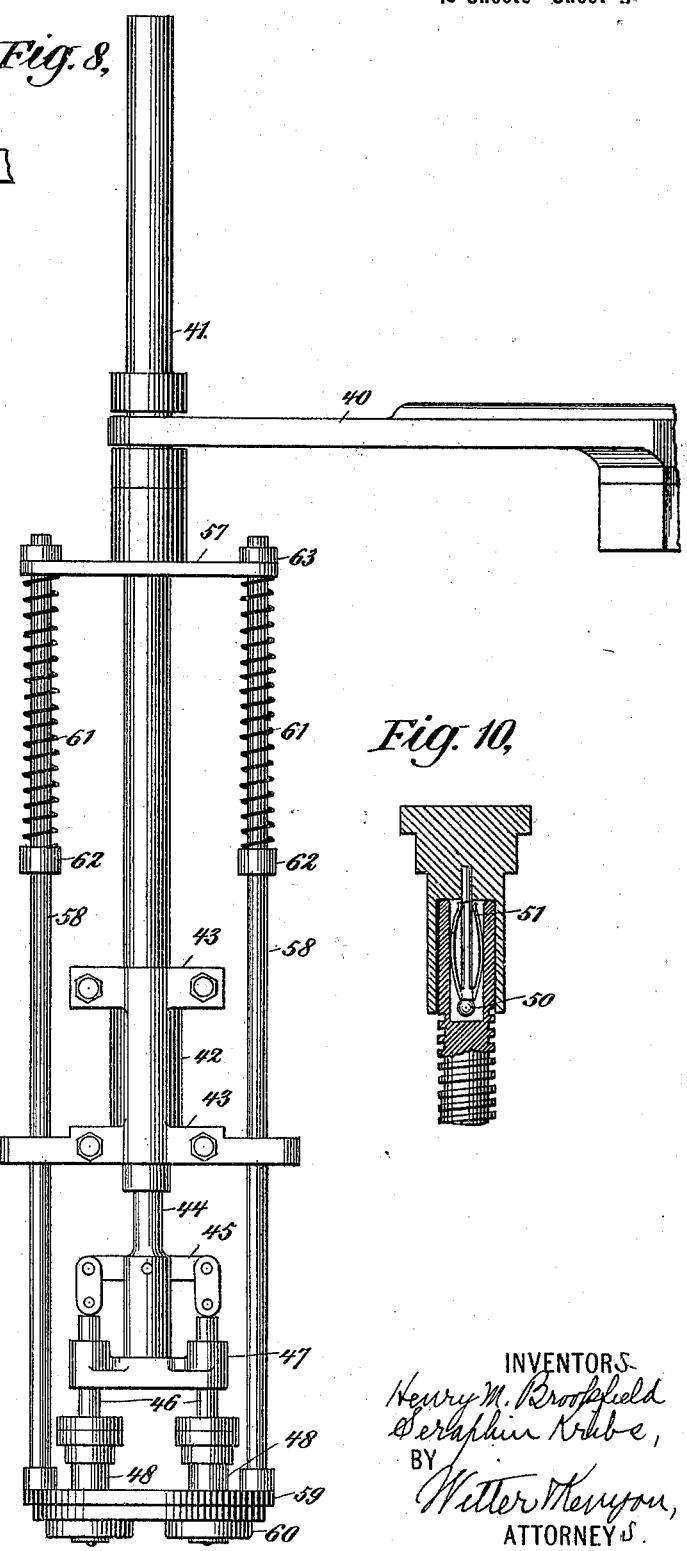
Fig. 8,
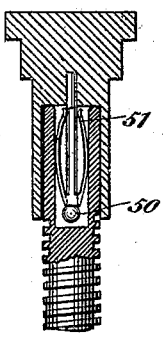
Fig. 10,
WITNESSES:
Edwin Segur
Jas. C. Howell
INVENTORS
Henry M. Brookfield
Seraphin Kribs,
BY
Witter & Kenyon,
ATTORNEYS.

No. 646,948. Patented Apr. 10, 1900.
H. M. BROOKFIELD & S. KRIBS.
PRESS FOR MOLDING INSULATORS.
(Application filed May 7, 1898.)
(No Model.) 10 Sheets—Sheet 6.
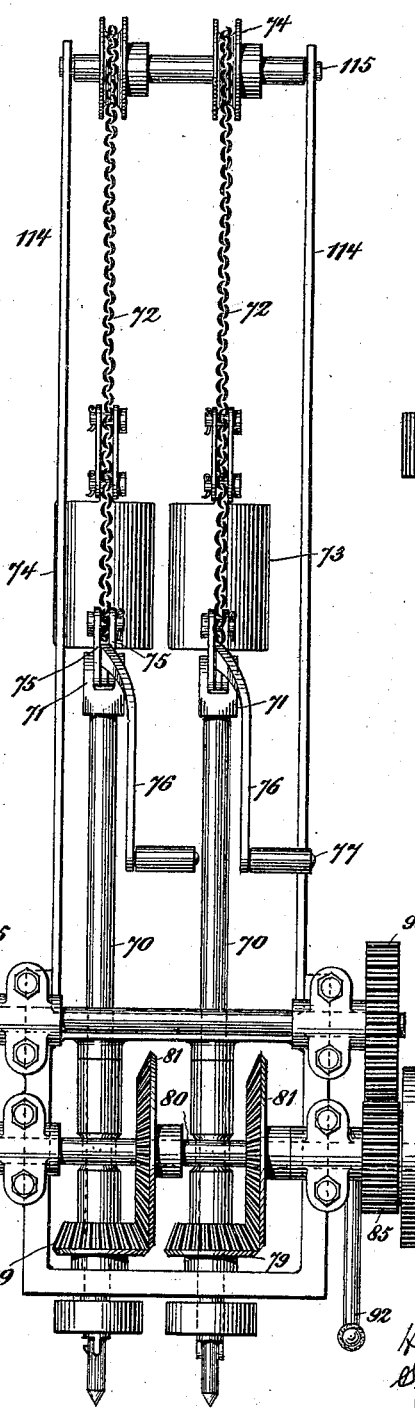

No. 646,948. Patented Apr. 10, 1900.
H. M. BROOKFIELD & S. KRIBS.
PRESS FOR MOLDING INSULATORS.
(Application filed May 7, 1898.)
(No Model.) 10 Sheets—Sheet 7.

WITNESSES:
Edwin Seger
Jas. C. Howell

INVENTORS
Henry M. Brookfield
BY Seraphin Kribs
Witter & Kenyon,
ATTORNEYS.

No. 646,948. Patented Apr. 10, 1900.
H. M. BROOKFIELD & S. KRIBS.
PRESS FOR MOLDING INSULATORS.
(Application filed May 7, 1898.)

(No Model.) 10 Sheets—Sheet 8.

WITNESSES:
INVENTORS
Henry M. Brookfield
Seraphin Kribs,
BY
ATTORNEYS

No. 646,948. Patented Apr. 10, 1900.
H. M. BROOKFIELD & S. KRIBS.
PRESS FOR MOLDING INSULATORS.
(Application filed May 7, 1898.)
(No Model.) 10 Sheets—Sheet 9.
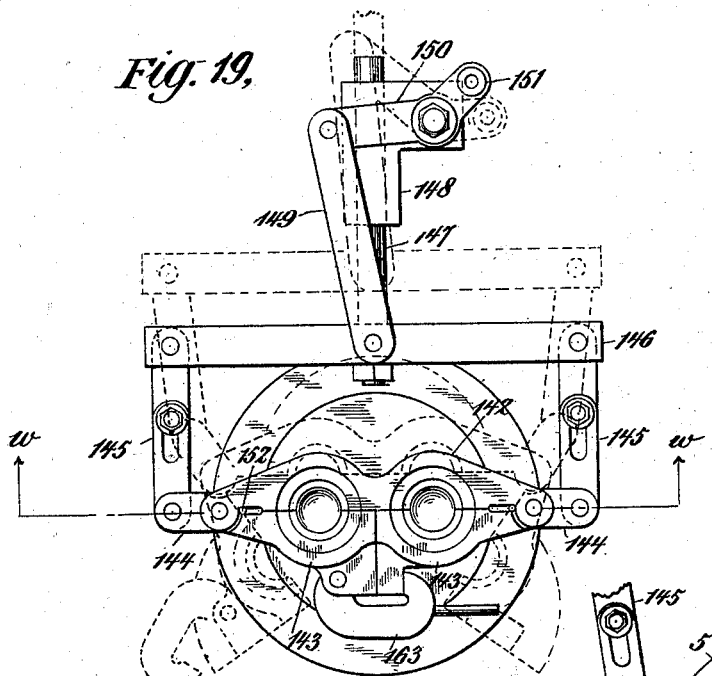
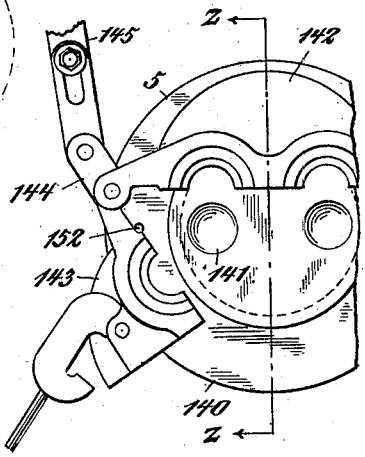
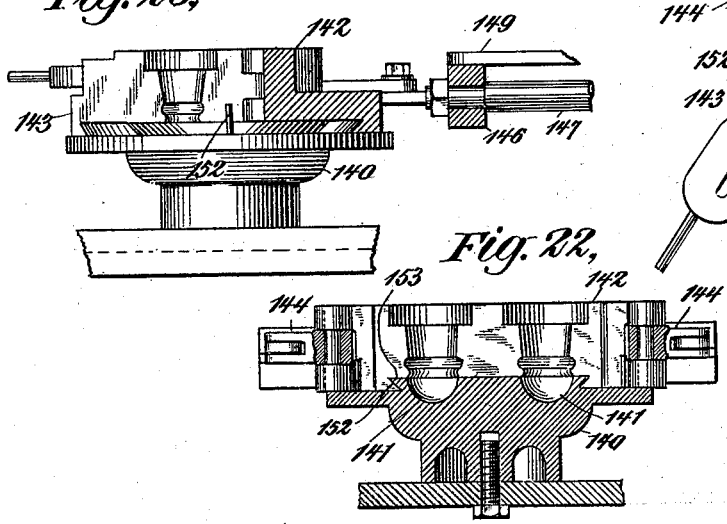
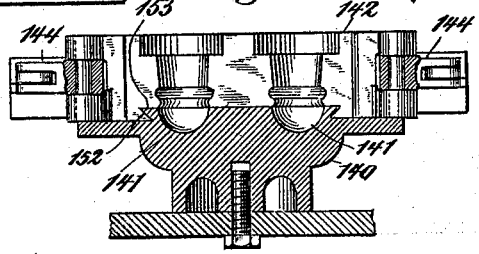
WITNESSES:
INVENTORS
Henry M. Brookfield
Seraphin Kribs,
BY
Witter & Kenyon
ATTORNEYS.

No. 646,948. Patented Apr. 10, 1900.
H. M. BROOKFIELD & S. KRIBS.
PRESS FOR MOLDING INSULATORS.
(Application filed May 7, 1898.)
(No Model.) 10 Sheets—Sheet 10.
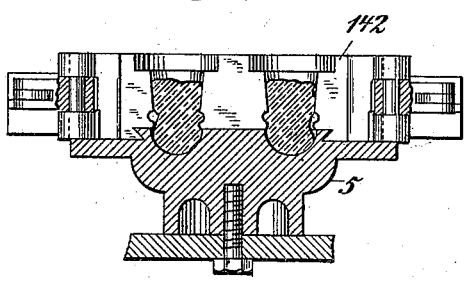
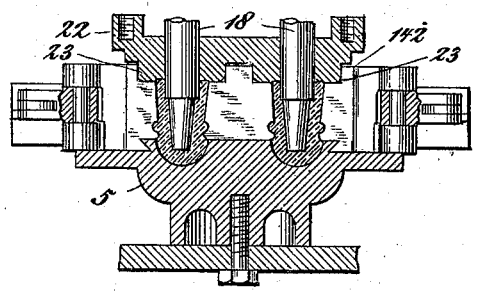
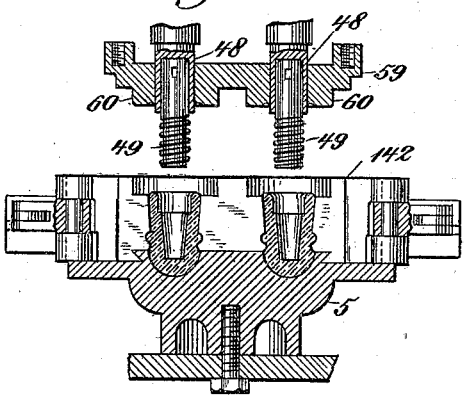
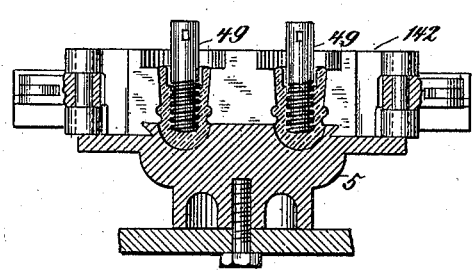
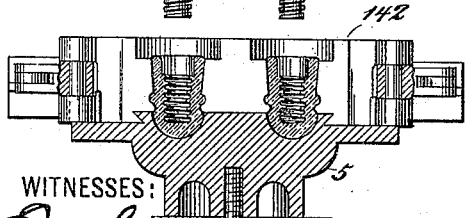
WITNESSES:
INVENTORS
Henry M. Brookfield
BY Seraphin Kribs
Witter Kenyon
ATTORNEYS.

UNITED STATES PATENT OFFICE.

HENRY M. BROOKFIELD AND SERAPHIN KRIBS, OF NEW YORK, N. Y., ASSIGNORS TO THE BROOKFIELD GLASS COMPANY, OF NEW YORK.

PRESS FOR MOLDING INSULATORS.

SPECIFICATION forming part of Letters Patent No. 646,948, dated April 10, 1900.

Application filed May 7, 1898. Serial No. 680,080½. (No model.)

*To all whom it may concern:*

Be it known that we, HENRY M. BROOKFIELD, a citizen of the United States, and a resident of New York city, in the county of New York, and SERAPHIN KRIBS, a subject of the Emperor of Germany, and a resident of New York, (Brooklyn,) in the county of Kings, State of New York, have invented certain new and useful Improvements in Presses for Molding Insulators or Similar Articles, of which the following is a full, clear, and exact specification, reference being had to the accompanying drawings, which form a part hereof.

The invention relates to presses for manufacturing insulators, such as are used on telegraph-lines, and other similar articles; and it is especially adapted for use in making what are known as "screw-insulators," although the press may be utilized for other purposes.

One object of the invention is to provide a press that will for the most part be automatic in its operation—that is to say, most of the parts of which can be operated by power.

Another object of the invention is to increase the capacity and efficiency of the press, whereby a larger number of insulators or other articles can be made within a given time.

The invention is designed also to increase the accuracy and certainty of the operation of the machine, to produce an article of improved quality, and to cheapen the cost of manufacture by reducing the amount of labor required to run the machine, as well as in other ways.

The invention consists, first, in the combination, in such a molding-press, of a suitable mold, an actuating-rod adapted to be reciprocated up and down above the mold, a compensating lever connected with the actuating-rod by any suitable intervening mechanism, plungers connected with the ends of the compensating lever, and a spring connection interposed between the compensating lever and the actuating-rod or some part thereof, and suitable means for operating the actuating-rod, whereby the plungers are forced into the mold by the actuating-rod, but the spring connection between the plungers and the rod enables the stroke of the plungers to be varied somewhat and to be thereby adapted to the varying amounts of glass or other material originally inserted in the cavity or cavities of the mold.

The invention also consists in the combination, with some or all of the devices above referred to, of means for connecting the actuating-rod with the driving-shaft whereby the rod and plungers are operated mechanically.

The invention also consists in the combination, with some or all of the parts already named, of a follower connected with the actuating-rod by a spring connection, whereby the follower and the plungers are both operated by the actuating-rod, but do not move rigidly with that rod, having the capacity of varying their stroke according to the character of the mold and the amount of glass or other material supplied thereto.

The invention also consists in the particular construction of the actuating-rod and the intermediate devices by which it is connected with the plungers and the follower and the mechanism which connects the actuating-rod with the driving-shaft.

The invention also consists in the combination of a revolving table having molds placed thereon at regulated distances, and means for automatically revolving the table with an intermittent motion, and means for automatically stopping the table in the proper predetermined positions, so that the molds will be under the actuating-rods or other devices for inserting or removing the plungers for shaping the material, and means for inserting and removing the same, whereby the table is automatically revolved at proper intervals and at the end of each partial revolution is stopped at the proper position for the insertion or removal of the plungers or for some other step in the operation of molding the insulator or other article.

The invention also consists in the combination, with a suitable mold, of an actuating-rod for inserting a screw-plunger in the mold, a screw-plunger adapted to be connected with the actuating-rod, and a revolving spindle for unscrewing or removing the plunger from the mold, and means for connecting the spindle with the driving-shaft, so as to cause the spindle to be revolved continuously, and means for reciprocating the spindle up and down toward or from the mold.

The invention also consists in certain special features of construction of the spindles for removing the plungers from the mold.

The invention also consists in certain other features of construction and combinations of parts hereinafter more fully explained.

While all the devices herein shown and described are adapted for use in one complete machine, some of the parts are capable of use in connection with other devices or in other combinations.

Referring to the drawings, Figure 1 is a top or plan view of the press. Fig. 2 is a vertical section on the line $x\,x$ of Fig. 1 looking in the direction of the arrows. Fig. 3 is a side elevation of the press looking from the bottom of Fig. 1 and having some parts broken away or not shown in the figure. Fig. 4 is a detail view of the first actuating-rod and its connected parts. Fig. 5 is a vertical section of the device shown in Fig. 4. Fig. 6 is a horizontal sectional view on the line $y\,y$ of Fig. 5. Fig. 7 is a bottom view of the plungers and followers and follower-plate shown in Fig. 4. Fig. 8 is a detail view of the second actuating-rod. Fig. 9 is a vertical section view of Fig. 8. Fig. 10 is a sectional view of a device for fastening the screw-plungers to the lower ends of the formers. Fig. 11 is a detail view of the spindles for removing the plungers. Fig. 12 is a sectional view showing the devices for connecting the lower ends of the spindles with the plunger. Fig. 13 is a side view of the same device, showing the end of the spindle above the plunger prior to insertion in the latter. Fig. 14 is a detail view showing the ratchet-wheel for revolving the table. Fig. 15 is a side view of the same parts, the reciprocating rod being partly broken away. Fig. 16 is a detail view, partly in section, of the dog for locking the table. Fig. 17 is a detail view of the cam for opening the molds. Fig. 18 is a similar view of the cam for closing the molds. Fig. 19 is a top view of one of the molds in a closed position, the position of the parts when the mold is open being represented in broken lines. Fig. 20 is a vertical section of the mold, taken on the line 2 2 of Fig. 21, looking in the direction of the arrows. Fig. 21 is a partial top view of the mold, showing the jaws in an open position. Fig. 22 is a vertical section on the line $w\,w$ of Fig. 19 looking in the direction of the arrows. Figs. 23 to 28 contain a series of sections of the mold, illustrating the different steps in the operation of the press and the manner in which the article is gradually molded.

Similar numbers represent corresponding parts in the different figures.

Referring to the drawings, 1 is the bed or carriage upon which the press is mounted. We prefer to provide the bed with wheels or rollers 2, as shown in Fig. 2, so that the press can be conveniently moved from one place to another.

3 is a central post or standard, from which the various parts of the machine are supported.

4 is a table which is adapted to revolve around the central post. This table is provided with a suitable number of molds 5 5, which are placed thereon at regulated distances, so that when the table is moved intermittently the molds will be brought in succession into the proper positions under the various actuating-rods and spindles. In the form shown in the drawings the table is provided with six molds placed at equal distances from one another.

6 6 are supporting-arms projecting from the post 3 and adapted to support the first actuating-rod and its connected parts. We prefer to fasten these arms to the central post in the manner illustrated in Fig. 3, so that by loosening the bolts these arms can be turned upon the post as a pivot, and the position of the actuating-rod can thereby be adjusted, if desired.

7 is the first actuating-rod. This rod is adapted to move up and down in bearings in the arms 6 6. The rod is made hollow, as shown in Fig. 5.

8 is an inner or intermediate rod which is adapted to enter and slide up and down in the hole in the rod 7.

9 is a pin passing through the rod 8 and projecting beyond that rod on either side and extending into slots 10 10 in the actuating-rod. This pin acts as a stop device to limit the downward motion of the rod 8 in the actuating-rod 7 and to cause the rod 8 to be lifted with the rod 7 when the pin 9 comes into contact with the lower end of the slots 10 10.

11 is a coiled spring inserted in the recess or hole in the actuating-rod and adapted to press down upon the upper end of the rod 8. At its upper end the spring bears against the nut 12. This nut is held in proper place vertically by means of the screw-bolt 13, which engages with the thread on the inside of the nut 12. The bolt 13 is supported by the nut 14, which engages with a thread on the inner surface of the upper end of the actuating-rod 7. The bolt is fastened to the nut 14 in any suitable way—as, for example, that shown in Fig. 5. In this case the nut 14 is clamped between the head of the bolt and a smaller nut immediately under the nut 14. The head of the bolt is provided with a cut to receive the end of the screw-driver, so that the bolt 13 can be easily turned. By turning the bolt 13 the nut 12 is forced up or down on the bolt, and in this way the tension of the spring 11 can be regulated. The nut 12 is provided with a lug 15, which projects into a slot in the side of the actuating-rod, (see Fig. 6,) and thereby prevents the nut 12 from turning with the bolt 13.

16 is a compensating lever pivoted at its middle point to the rod 8 and connected at its ends by means of pivoted links with the plunger-rods 17, which carry at their lower ends the plain plungers 18. These plain plungers are made of such a shape as to properly mold the glass and to produce the desired form and size of cavity or recess into which the screw-plunger is afterward inserted. To the lower end of the rod 8 is connected a guide-plate 19, having openings through which the plunger-rods slide.

20 is a plate fastened to the lower end of the actuating-rod 7. In the form shown this plate is circular in shape and is provided with six holes or apertures, through which the follower-rods 21 pass and slide. The follower-rods carry at their lower end the follower-plate 22, which carries and supports the followers 23.

24 are coiled springs encircling the follower-rods and at their lower ends bearing against collars 25, secured to the follower-rods, and at their upper ends against the plate 20. Two of the follower-rods, preferably those at the sides, are made longer than the others and slide in bearings 26, formed in projecting portions of the frame. These two rods are also provided with the collars 27, which are fastened to the rods and which act as a stop device, against which the plate 20 strikes in its upward motion, thereby lifting the follower-rods and follower-plate.

28 is a grooved cross-head which is fastened to the actuating-rod in any suitable way.

29 (see Fig. 4) is a bearing-block made to fit the groove in the cross-head 28 and slide back and forth in said groove.

30 is a disk fastened to the shaft 31 so as to revolve therewith. This disk carries a pin 32, which passes through a bearing in the block 29 and is adapted to turn therein. The shaft 31 (see Fig. 3) is mounted in suitable bearings in arms which are supported from the central post or standard. This shaft is provided with gear-wheel 33, which meshes with the gear-wheel 34 on the shaft 35. The shaft 35 carries the gear-wheel 36, which meshes with the gear-wheel 37 on the shaft 38. The shaft 38 is provided at one end with the sprocket-wheel 39, which is connected in any suitable way with the driving-shaft of the machine or with any source of power. As the disk 30 is revolved the actuating-rod 7 is reciprocated up and down mechanically and automatically and is given a positive and regular motion. When the actuating-rod is forced down, the intermediate rod 8 is also forced downward by the spring 11, and the plungers are forced into the mold. The compensating lever 16 enables one plunger to be driven down farther than the other, so as to compensate for the different quantities of material that may have been supplied to the two recesses of the mold. When the two plungers have been forced into the mold so as to completely fill the two cavities of the mold, the downward motion of the rod 8 ceases, and any further downward motion of the rod 7 simply tends to compress the spring 11, the rod 8 sliding upward in the rod 7. If the plungers were connected rigidly with the rod 7, the plungers would necessarily be forced down to the same point at each stroke of the actuating-rod, and if a larger supply of glass had been put into the mold than had been proper the mold or the plungers or some part of the machine would necessarily have been broken. By making the parts in the manner described and interposing the spring 11 we make it possible to operate the plungers by power and at the same time to give the plungers a variable motion, so as to prevent the breaking of the machine. When the actuating-rod is forced down, the follower-plate, with its followers, is also forced down until it strikes the top of the mold, as shown in Fig. 24. Any further downward motion of the actuating-rod tends merely to compress the coiled springs 24.

Referring to Figs. 1, 8, and 9, 40 is a connecting-arm securely bolted or fastened at one end to the top of the grooved cross-head 28 and fastened at its other end to the second actuating-rod 41. This rod 41 reciprocates up and down in bearing 42, which is supported by the arms 43, that project outwardly from the central post or standard. The inner ends of these arms are preferably fastened to the post or standard in the manner already described—to wit, by means of bolts and caps, so that by loosening the bolts the arms can be turned or swung on the post 3 as a center and the position of the rod 41 can thereby be adjusted. The rod 41 is made hollow similarly to the rod 7. (See Fig. 9.) 44 is an intermediate or inner rod. 45 is a compensating lever pivoted at its middle point to the rod 44 and connected at its ends by means of pivoted links with the plunger-rods 46. These rods 46 slide in bearings in a guide-plate 47, carried by the lower end of the rod 44. 48 are formers attached to the lower ends of the rods 46 and provided with recesses adapted to receive the screw-plungers 49. The formers are provided with pins 50, (see Fig. 10,) and these pins carry the spring-pieces 51. The upper end of the screw-plungers is formed with a recess or cavity adapted to receive the pin and its spring-pieces. When the screw-plunger is forced into the former, it is held in place in the former by means of the spring-pieces 51. 52 is a coiled spring placed inside of the rod 41 and adapted to bear down upon the upper end of the rod 44. The same means is employed for regulating the tension of this spring, as has been already described in connection with the actuating-rod 7, and consists of the nut 53, engaging with the screw-threaded bolt 54 and provided with the lug 55 and the nut 56, adapted to engage with a thread on the inner surface of the rod 41, the nut 56 being secured to the bolt 54 by any suitable means. 57 is a cross-head fastened in any suitable way to the actuating-rod 41, so as to move up and down with that rod. Cross-head 57 is provided with holes or openings through which the follower-rods 58 slide. These follower-rods carry at their lower ends the follower-plate 59, which in turn carries the followers 60. 61 are coiled springs encircling the follower-rods and bearing at their lower ends against collars 62 on said rods and at their upper ends against the cross-head 57. The follower-rods are provided also with collars 63, which act as a stopping device against which the cross-head 57 strikes in the upward motion, whereby the plate and followers are lifted with the actuating-rod. The intermediate rod 44 is provided with a pin 64, projecting through said rod and extending at both ends into slots 65 65 in actuating-rod 41. This pin acts as a stop to limit the downward motion of the rod 44 in the actuating-rod 41 and to cause the rod 44 to be lifted with the rod 41. The screw-plungers are inserted in the formers 48 when they are in the highest position. The actuating-rod 41 is then forced down, carrying with it the formers, plungers, and followers. When the follower-plate strikes the top of the mold, the follower-plate and its rods cease their downward motion, and any further downward motion of the rod 41 simply compresses the spring 61. The screw-plungers and formers are forced into the mold. The compensating lever 45 enables the screw-plungers to accommodate themselves to varying quantities of material in the two recesses of the mold. When the material in both recesses has been properly formed and molded, if the actuating-rod continues to descend the rod 44 remains stationary, the spring 52 being compressed.

Referring to Figs. 1, 3, 11, 12, and 13, 66 are arms fastened to the central standard by means of caps and bolts, as shown in Fig. 3, so that by loosening the bolts these arms can be turned upon the standard as a center. 67 is a connecting-piece joining the outer ends of the arm 66. 68 is a plate fastened by means of bolts or otherwise to the piece 67, and in such a way that the plate 68 can be adjusted in a vertical direction. 69 69 are two arms projecting from the plate 68 and carrying at their outer ends the frame-pieces and bearings for supporting the spindles by means of which the screw-plungers are removed from the molds. 70 70 are the spindles. These spindles are mounted in suitable bearings, as shown in Fig. 11, and are adapted not only to revolve in these bearings, but also to be reciprocated vertically therein. The upper end of each spindle is provided with a head 71, in which the upper end of the spindle is adapted to turn. 72 is a chain connecting the spindle with a weight 73. The chain passes over the grooved pulley 74. The lower end of the chain is connected to the head of the spindle in any suitable way. In the form shown in Fig. 11 two pivoted links 75 are employed for this purpose. 76 is a lever for reciprocating the spindle in a vertical direction. This lever is provided with a handle 77 and passes between the links 75 and at its rear end is pivoted to the link 78, which in turn is pivoted at its lower end to the frame of the machine. 79 is a beveled gear-wheel which is feathered to the spindle, so as to revolve therewith, but so as to permit the spindle to move up and down in the gear-wheel without disconnecting the same. 80 is a shaft mounted in suitable bearings in the frame and provided with the two beveled gears 81, which mesh with the gear-wheels 79. 82 is a sleeve which is adapted to turn loosely on the shaft 80 except when it is connected therewith by means of the clutch 83. This clutch can be of any suitable variety. The sleeve 82 is provided with a hollow pulley 84, with which the clutch 83 is adapted to engage and is also provided with the gear-wheel 85. A similarly-constructed sleeve 86 is mounted on the other end of the shaft 80. It is provided with a clutching device 87, a hollow pulley 88, and a gear-wheel 89. The clutches are operated by means of the rod 90, (see Fig. 1,) adapted to slide in suitable bearings in the frame of the machine and provided with an arm 91 at each end. The arm 91 is forked at its outer end and this forked portion projects into a groove in the clutch. 92 is a handle connected with the rod 90 for operating the same. 93 is a coiled spring on the rod 90 for moving that rod in one direction. When by means of the handle 92 the rod 90 is moved to the right, referring to Fig. 11, the clutch 87 is engaged with the pulley 88, and the sleeve 86 is thereby connected with the shaft 80. When the handle is released, the coiled spring 93 moves the rod 90 in the other direction, releases the clutch 87 from the pulley 88, and engages the clutch 83 with the pulley 84 at the other end of the shaft, as a result of which the shaft 80 and the sleeve 82 are made to revolve together. 94 is a shaft suitably mounted in bearings in the frame of the machine and provided with the gears 95 and 96, adapted to mesh with the gears 89 and 85, respectively. Shaft 94 is also provided at one end with the sprocket-wheel 97. This wheel is connected by means of the chain 98 with the sprocket-wheel 99 on the shaft 100. (See Figs. 2 and 3.) The shaft 100 is carried in a bearing in the arm 101. This arm is fastened to the standard 3 in any suitable way, as by means of caps and bolts. By loosening the bolts the arm 101 can be turned upon the standard. The inner end of the shaft 100 is provided with a beveled gear 102, which meshes with a beveled gear 103, which is adapted to turn loosely on the central standard. The gear 103 is driven by the gear 104, (see Fig. 3,) which is mounted upon the shaft 38. When the arm 101 is turned upon the central standard for the purpose of adjustment, the gear 102 simply rides upon the gear 103 without becoming disengaged therefrom.

It will be observed that the gears 85 and 89 on the shaft 80 are different in size and also that the gears 95 and 96 on the shaft 94 are likewise different in size. As a result of this construction the speed of the shaft 80 can be varied. By operating the clutch so as to engage the sleeve 86 with the shaft 80 that shaft will be driven by the gear 95. By reversing the clutching mechanism, so as to engage the clutch 83 with the sleeve 82, the rod 80 will be driven from the gear 96, which will give the shaft 80 a higher rate of speed. The sizes and arrangement of these gears can be modified to any extent, so as to secure any desirable rate of speed. As a result of this construction the spindles 70 are revolved continuously from the driving-shaft of the machine.

The device for engaging the lower end of the spindle with the screw-plunger is shown in Figs. 12 and 13. The lower end of the spindle is recessed, as shown, and is provided with a dog 105, which is pivoted in the recess, as shown in Fig. 12. This dog is provided with a tooth 106, projecting from its lower end, adapted to catch in a slot 107 in the upper end of the screw-plunger 49. The dog is also provided with a projecting lug 108, upon which bears an annular weight 109, which encircles the spindle. This weight is slotted on one side at 110, and a projecting piece 111 of the dog extends into this slot, so as to cause the weight 109 to revolve with the spindle. The lower end of the spindle is also provided with the lugs 112, which project into the grooves 113 in the top of the screw-plunger, so as to cause the plunger to revolve with the spindle. When the mold has been brought into proper position under the spindles, the spindles which are revolving in the proper direction are forced down by the levers 76 until the lower ends of the spindles are forced into the recesses in the upper end of the screw-plungers. The lugs 112 enter the grooves 113 and cause the screw-plunger to revolve with the spindle. At the same time when the tooth 106 strikes the edge of the screw-plunger the tooth is forced back until it slips by the upper end of the plunger, and this raises the projection 108 and lifts the weight 109. When the tooth 106 has been depressed far enough to be brought opposite the slot 107 in the plunger, the weight 109 turns the dog back on its pivot and forces the tooth 106 into the slot 107, thus engaging the plunger with the spindle. The levers 76 76 are then released, as a result of which the weights 73 raise the spindles and with them the screw-plungers. 114 are bars projecting upward from the arm 69 and supporting at their upper ends the rod 115, upon which the pulley 74 revolves. 116 (see Figs. 1 and 3) is a strengthening-bar connecting the part of the frame which carries the spindles with the arm 101, which carries the shaft 100. The bar 116 is made in two parts, so as to be adjustable. This construction enables the supporting-arms 66 and the arm 101 to be turned upon the central standard together, so as to adjust the position of the spindles and bring them over any desired part of the press without disconnecting the operating parts.

Referring to Figs. 1, 2, 14, 15, and 16, 117 is a rod for operating the devices for revolving and stopping the table. This rod is mounted in suitable bearings 118 in the frame of the machine and is adapted to be reciprocated back and forth therein. 119 (see Fig. 14) is a link pivotally connected at one end with the rod 117 and at the other end with the two plates 120. These two plates are pivoted so as to turn loosely on the shaft 121. 122 is a pawl pivoted on a pin fastened to and connecting the plates 120. 123 is a ratchet-wheel fastened to the shaft 121, so as to turn therewith, and provided with teeth so spaced as to give the table the desired intermittent throw. In the form shown the ratchet is provided with six teeth placed at equal distances from one another. The pawl 122 is made to engage with the ratchet-teeth by means of the spring 124. The shaft 121 is provided at its lower end with the gear-wheel 125, which meshes with the gear-wheel 126, which is fastened to and turns with the table. When the rod 117 is moved to the left in Fig. 2, the pawl 122 is moved backward around the shaft 121 and made to engage with the next tooth of the ratchet 123. When the rod 117 is moved to the right, the ratchet is turned, and thereby the table is revolved one-sixth of a circle, a sufficient distance to move a mold from one position to the next position—for example, from underneath the first actuating-rod to a position under the second actuating-rod, and so on. The arm 117 is provided with a cam-bearing or arm 127, which is securely fastened to the arm 117. 128 is a cam of suitable form mounted on the shaft 31, so as to revolve with that shaft. This cam presses against the cam-bearing 127 and forces the rod 117 to its extreme right-hand position, thereby revolving the table, as already explained. The arm 117 is forced in the other direction by the coiled spring 129, which operates to bring the arm 117 and the pawl into a position where the pawl will engage another tooth of the ratchet 123. 130 are bars fastened at one end to the rod 117 and at the other end to a sleeve 131, which is adapted to slide on the rod or dog 132, as shown in Fig. 2. The two bars are united at the middle point by means of a bolt 133 for the purpose of strengthening the connection. The lower end of the bar is connected to the sleeve 131 in any suitable way—for example, by means of pins projecting from the sleeve 131 and passing through slots in the lower ends of the bars. The dog 132 is adapted to reciprocate in bearings 134, carried by an arm projecting from the bed of the machine.

The dog is also provided with a collar 135, fastened to the dog. 136 is a coiled spring encircling the dog and bearing at one end against the collar 135 and at the other end against the sleeve 131. 137 is a collar fastened to the dog 132 at the outer end beyond the sleeve 131 and made adjustable on the dog. It has an arm 138, which projects between the two bars 130. The table is provided with recesses 139, placed at regulated distances, into which recesses the inner end of the dog is adapted to enter, so as to stop the table at the proper position. The recesses are put at such points around the revolving table and the dog is so timed in its operation that when the table has been revolved sufficiently so that the molds are brought under the actuating-rods and spindles the dog is thrust into one of the recesses and the table is thereby stopped at the proper place. When the rod 117 is reciprocated to the right, as shown in Fig. 2, by means of the cam, the sleeve 131 is pressed against the spring 136, and the dog is thereby forced into the recess 139 with a yielding pressure. When the rod 117 is forced in the other direction by means of a spring 129, the sleeve 131 is moved outward away from the table and strikes the collar 137 and withdraws the dog from the recess 139.

Referring to Figs. 1, 3, and 19 to 22, 5 is a mold which in the best form of my invention is made in the form shown in the drawings. 140 is the base or bottom piece of the mold. This is attached to the table in any suitable way—for example, as shown in Fig. 22, by means of a bolt. This bottom piece is provided with two recesses or cavities 141 to adapt it to form the lower ends of the insulators or other articles to be molded. The upper part of the mold consists of three jaws—the rear jaw 142, forming the rear half of the upper portion of the mold and provided with two recesses or cavities, as shown, and the two front jaws 143. The two front jaws together are adapted to form the front half of the upper part of the mold. Each of the front jaws is provided with a suitable recess or cavity, as shown. The front jaws are pivoted at their ends to the ends of the rear jaw 142. The front jaw is extended beyond the pivot, so as to form a short projecting arm 144. This arm is pivoted at its end to the link 145. The links 145 are preferably made in two pieces bolted together, as shown, so that their length can be properly adjusted. The two arms 145 are pivoted at their rear ends to the cross-head 146. This cross-head is supported and guided by the rod 147, which slides back and forth in a bearing in the block 148, which is securely fastened to the revolving table. The rod 147 being guided by its bearing in the block 148 causes the cross-head to move back and forth in a straight line. The cross-head 146 is connected by means of a pivoted link 149 with the two-armed pivoted lever 150. This lever carries at its rear end a cam-roller 151.

152 are guiding-pins securely fastened to the bottom piece of the mold and projecting into a slot formed between the front and rear jaws. The front and rear jaws when closed are firmly secured to the bottom piece by means of a dovetailed connection 153. (Shown in Fig. 22.)

The mold is opened and closed by means of cams. (Shown in Figs. 1, 3, 17 and 18.) 154 are arms projecting from the central standard and secured thereto, so as to be capable of being turned on the standard as a center for the purpose of adjustment. 155 is a rod adapted to move back and forth in bearings carried by arms 154. This rod carries a cam 156, against which the cam-roller 151 is adapted to strike. The cam-roller 151 rides up on the outer face of the cam 156, and by this means the mold is opened, as hereinafter explained. The cam 156 is enabled to yield somewhat to the pressure of the cam-roller by means of the coiled spring 157, which bears at one end against a collar 158 on the rod 155 and at the other end against one of the bearings of the rod 155. This coiled spring tends to hold the cam 156 in its normal position.

The cam for closing the mold is shown in Fig. 18. 159 are arms supported from the central standard and capable of adjustment thereon. These arms carry the rod 160, which is adapted to slide back and forth in bearings projecting down from the arms 159, as shown. 161 is a cam carried by the rod 160. The cam-roller 151 is adapted to strike against the rear surface of cam 161, and thereby cause the mold to be opened. The cam 161 is enabled to yield somewhat to the pressure of the cam and roller by means of the coiled spring 162, which bears at one end against one of the bearings of rod 160 and at the other end against a collar on the rod 160. The cam 156 is placed in such a position with reference to the revolving table that after the screw-plungers have been removed from the mold by the revolving spindles and the table is again revolved the cam-roller 151 strikes against the front surface of the cam 156, as shown in Fig. 1. The lever 150 is thereby rocked on its pivot so as to draw the cross-head 146 back into the position shown in broken lines in Fig. 19. This draws back the links 145 and causes the rear jaw 142 of the mold to be drawn back and the front jaw to be opened out, as shown in dotted lines in Fig. 19. The front jaws are made to open by reason of the fact that the guiding-pin 152 bears against the inner surface of the front jaw and causes the front jaw to be rocked around that pin. The relative position of the front jaw and the pin when the jaws are closed is shown in Fig. 19, and the relative position of these parts when the jaws are open is shown in Fig. 21. The jaws of the mold remain open for a sufficient length of time to allow the insulators or articles to be removed. Then the cam-roller 151 strikes the rear surface of the cam 161 and the lever 150 is rocked in the other direction, thereby forcing the cross-head 146 forward into the position shown in full lines in Fig. 19. In this movement of the jaws the rear jaw 142 is moved forward until it strikes the guiding-pin 152. The forward motion of the cross-head 146 and the links 145 still continues, which results in rocking the front jaws on their pivots and closing them. The front jaws are then locked together by means of the catch 163.

The general operation of the press is as follows: When the mold is closed in the position shown at 164 in Fig. 1, a supply of molten glass or of the material that is being molded is placed in each recess of the mold. The condition of the mold at this time is represented in section in Fig. 23. When the rod 117 is next moved by the cam 128, the table is revolved one-sixth of a circle and is locked accurately in a position immediately under the first actuating-rod 7. The actuating-rod is then depressed by the means already described, and the plain plungers 18 are forced into the mold so as to shape the glass, as shown in Fig. 24. The actuating-rod is then raised, lifting the follower and the plain plungers up from the mold. The table is again revolved a sixth of a circle in the manner already described until the mold is brought under the second actuating-rod and the table locked in that position. The screw-plungers 49 have meanwhile been inserted in the formers 48, as shown in Fig. 9. At the next throw of the actuating-rod 7 the second actuating-rod 41 is depressed and the screw-plungers and formers are forced into the mold. In Fig. 25 the screw-plungers and formers are represented as just about to enter the mold. The second actuating-rod is then raised; but the pressure of the glass upon the screw-plungers causes these screw-plungers to be drawn out of the formers and to remain in the articles, as shown in Fig. 26. The table continues to revolve in the manner already described until the mold is brought under the spindles 70 and the table locked in that position. The spindles are then depressed, by means of the levers 76, until the lower ends of the spindles are engaged with the screw-plungers. The levers are then released and the screw-plungers are unscrewed from the articles in the mold and lifted away from the mold. The screw-plungers are then removed from the spindles. The spindles constantly revolve and, as already explained, their speed of revolution can be varied by means of the clutching mechanism, so as to be made to operate at the requisite degree of speed. The table is again revolved, and immediately the cam-roller 151 strikes against the cam 156, which throws the mold open. The insulators are then removed from the mold by any suitable means. At the next revolution of the table the cam-roller strikes the cam 161, as a result of which the mold is automatically closed and brought back again to the position from which it started, (shown at 164 in Fig. 1.)

Fig. 27 represents the position of the screw-plungers immediately after they have been unscrewed from the mold.

Fig. 28 shows the insulator completely formed and ready to be removed from the mold.

Figure 1:
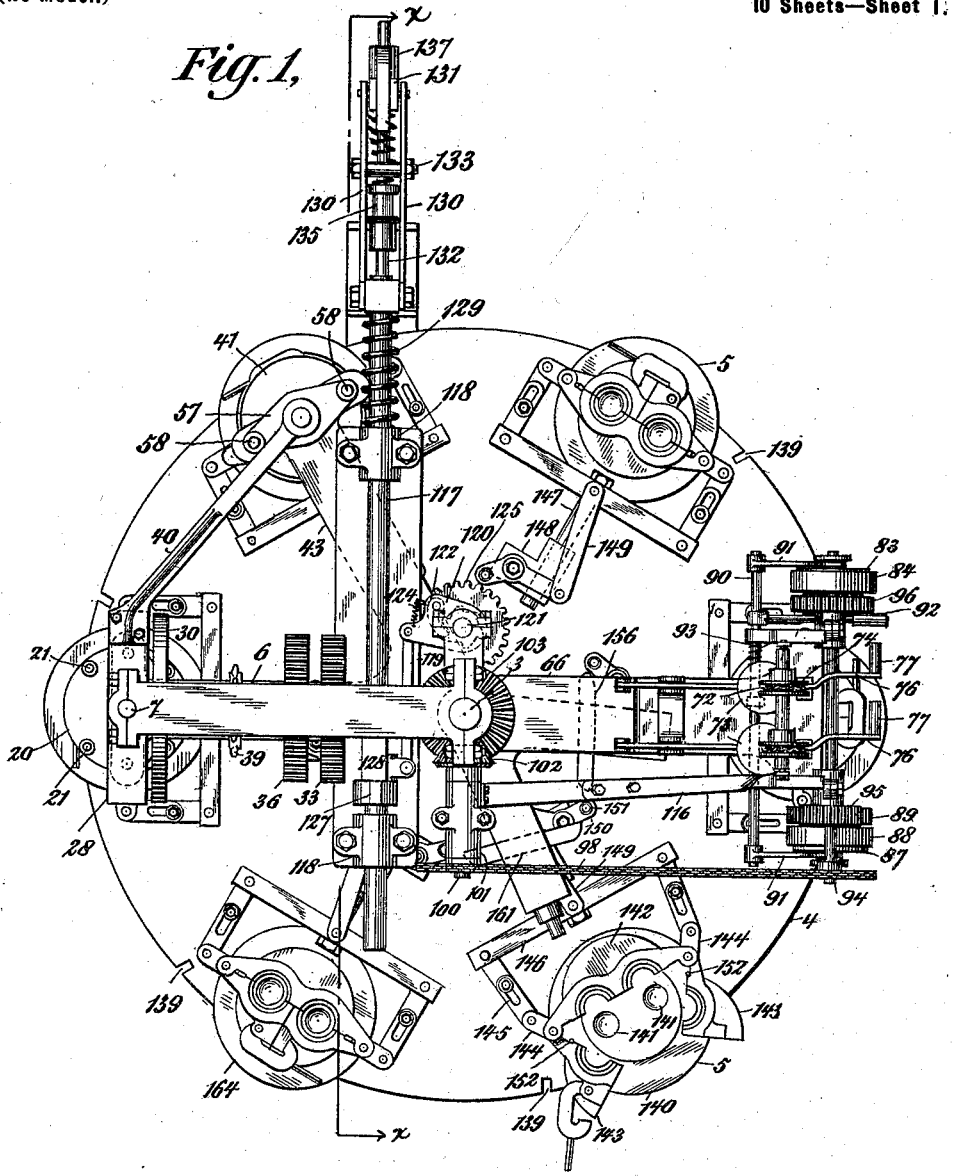
Figure 2:
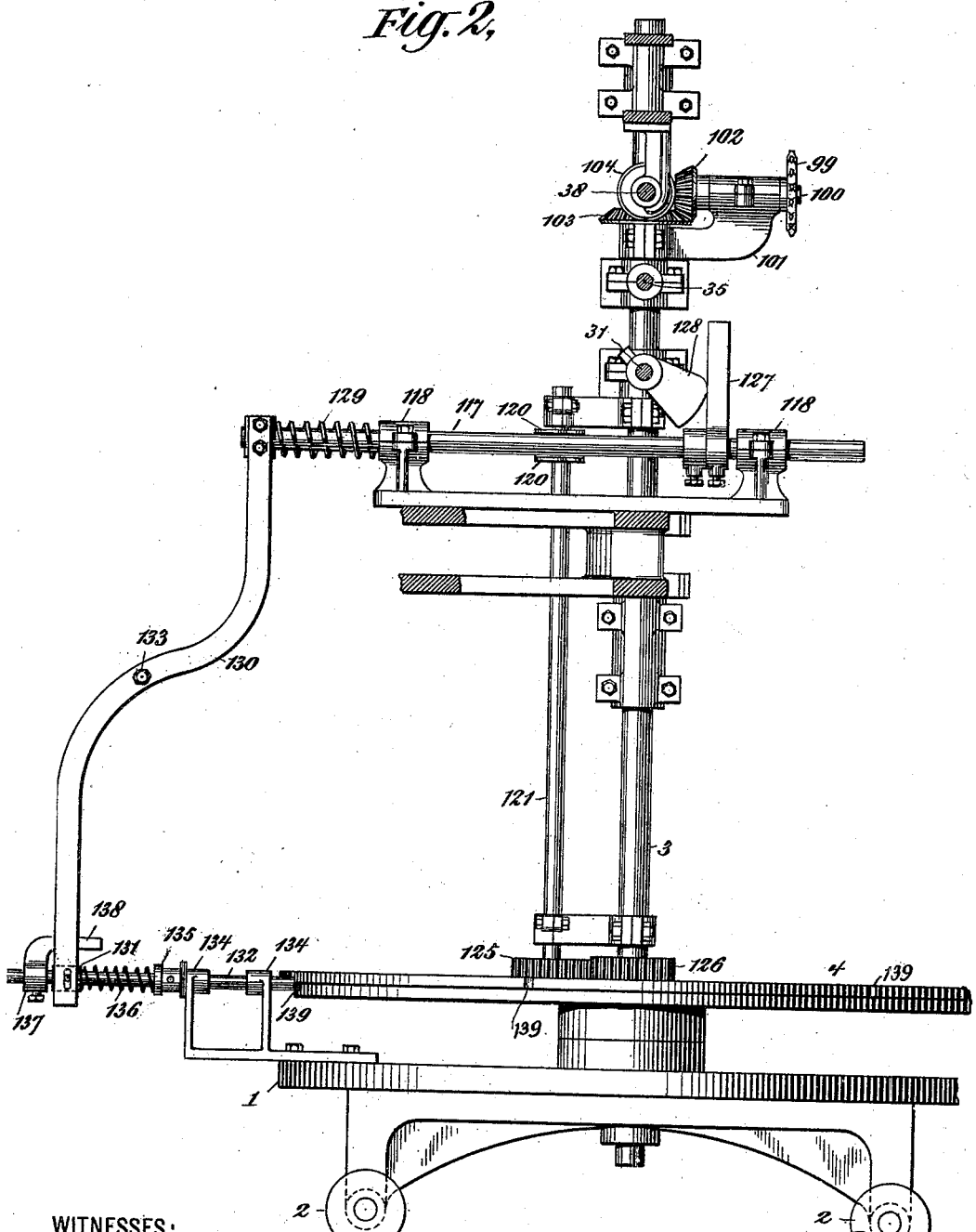
Figure 3:
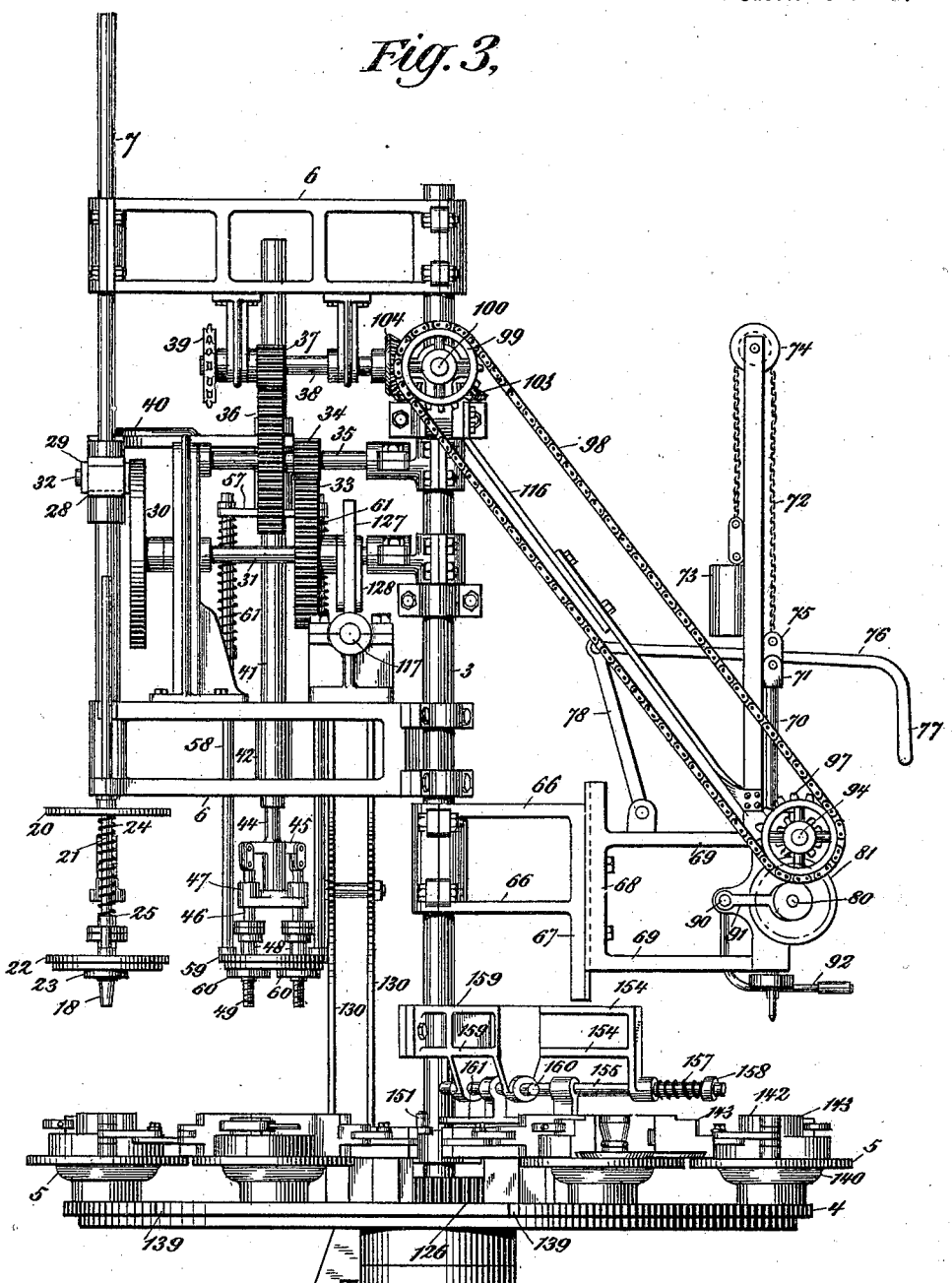
Figure 14:
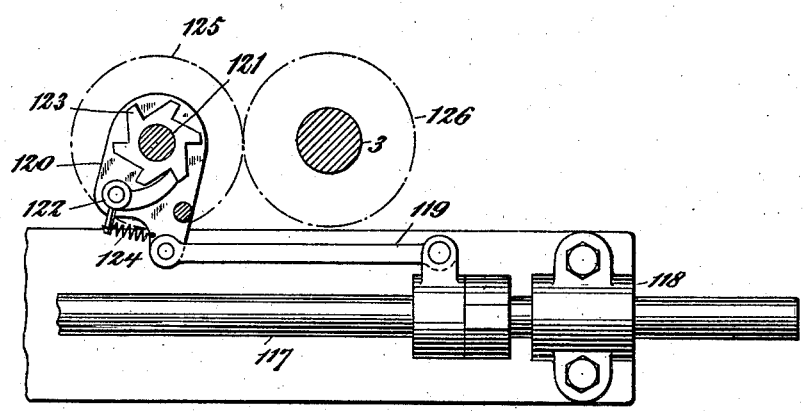
Figure 15:
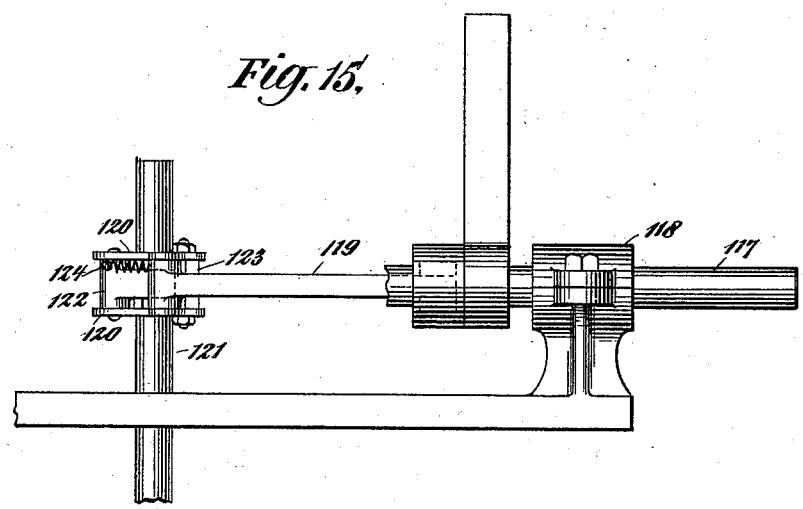
Figure 16:
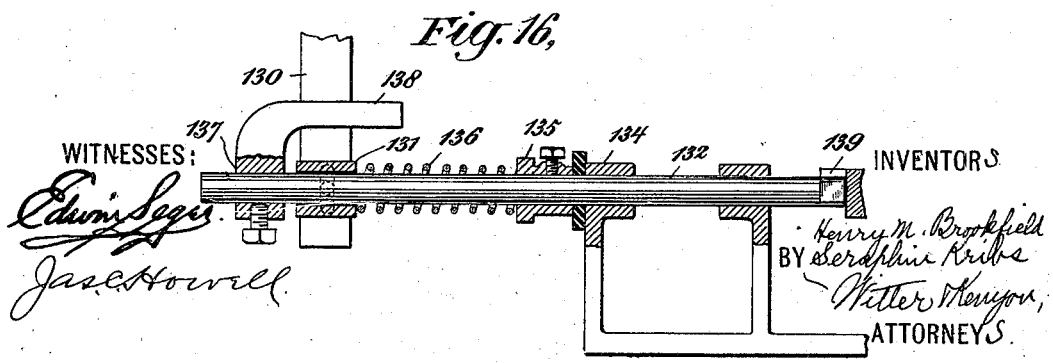
Figure 17:
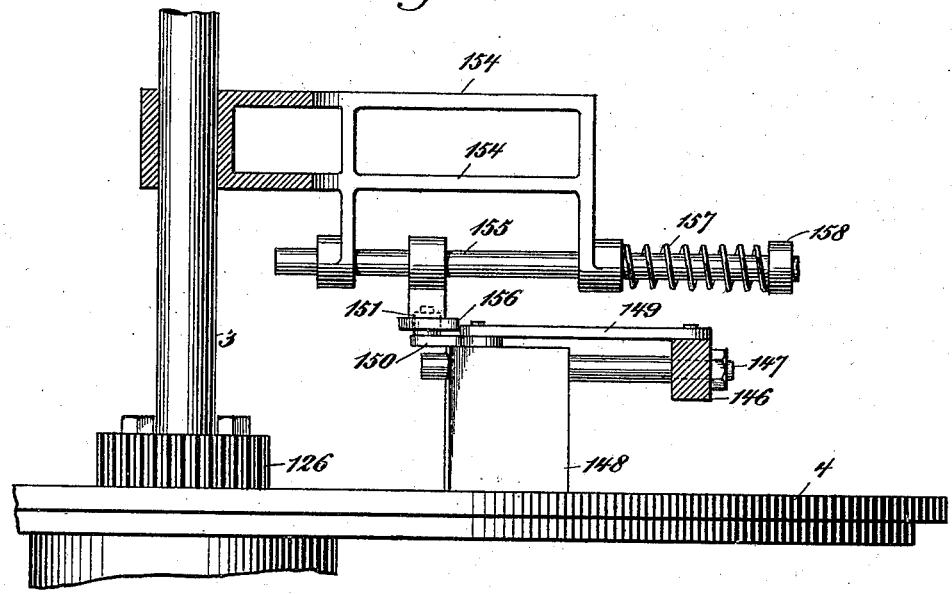
Figure 18:
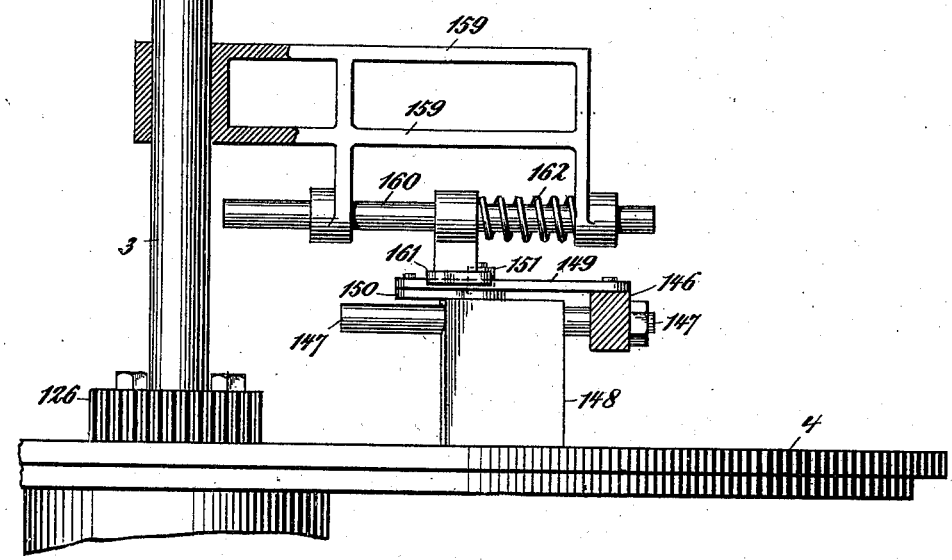

Many important advantages are secured by our improved press, some of which are as follows: The operation of the press is entirely mechanical and automatic except in three respects—namely, first, the furnishing of the glass to the mold at the beginning of the operation; secondly, the vertical reciprocation of the spindles for removing the plungers, which is done by means of hand-levers, and, thirdly, the removal of the finished articles from the mold after the mold has been opened. The molding and compressing of the material are entirely accomplished by mechanical devices.

Hitherto it has generally been deemed impossible to operate a press of this kind by power, for the reason that when this is done the actuating-rod has the same throw at every stroke, and as the quantities of glass applied to the mold necessarily vary it was supposed that the actuating-rod, if operated by power, would frequently cause the breaking of the mold or the rod itself or its connecting parts, or, in other cases, would fail to completely mold or form the article, the latter result occurring where too small a quantity of glass has been supplied to the mold. Our improvement enables these actuating-rods to be operated by power without producing any of these undesirable results. Our improved press can be operated much more rapidly than presses have heretofore been worked and the operations being mechanical are always accurate and certain. When manual labor is employed to carry out these different steps imperfect work or breaking results frequently from lack of skill or attention on the part of the operative. These disadvantages are overcome by our invention. By properly spacing the molds and stopping the machine automatically in predetermined positions the molds are brought into their operative positions underneath the actuating-rods with accuracy and with expedition. By continuously revolving the spindles and doing this automatically the removal of the screw-plungers from the molds is performed rapidly and more satisfactorily. As a result of the method of constructing and combining different parts the various actuating devices can be easily and accurately brought to any desired position and secured firmly therein. The method of constructing our mold enables the mold to be easily and quickly opened and closed and enables the articles to be readily removed therefrom.

It will be apparent that many modifications or changes may be made in the machine without departing from the invention. For example, the number of molds may be varied, or, if desired, the first actuating-rod might be done away with and the screw-plungers inserted directly in the glass without any previous forming of the material. In this case the actuating-rod that inserts the screw-plungers could be constructed exactly as shown in the drawings, or the actuating-rod 41 could be directly connected with the grooved cross-head 28. If desired, the clutching mechanism connected with the devices for revolving the spindles could be omitted and the spindles could be driven at a predetermined and constant speed. The clutching mechanism merely enables the speed to be changed. Again, in the best form of our invention we combine with each actuating-rod a compensating lever with two or more plungers. It will be apparent that many parts of our invention might be employed in a device in which a single plunger was connected with each actuating-rod.

What we claim as new, and desire to secure by Letters Patent, is—

1. In a molding-press, the combination of a suitable mold, an actuating-rod composed of two parts, a compensating lever connected with the actuating-rod, plungers connected with the ends of the compensating lever, a spring interposed between the two parts of the actuating-rod, and means for operating the actuating-rod, substantially as set forth.

2. In a molding-press, the combination of a suitable mold, an actuating-rod composed of two parts, a compensating lever connected with the actuating-rod, plungers connected with the ends of the compensating lever, a spring interposed between the two parts of the actuating-rod, and means for connecting the actuating-rod with the driving-shaft whereby the rod and plungers can be operated mechanically.

3. In a molding-press, the combination of a suitable mold, an actuating-rod composed of two parts, a compensating lever connected with the actuating-rod, plungers connected with the ends of the compensating lever, a spring interposed between the two parts of the actuating-rod, a follower connected with the actuating-rod, one or more springs interposed between the follower and the actuating-rod, and means for connecting the actuating-rod with the driving-shaft whereby the rod and plungers and follower can be operated mechanically.

4. In a molding-press, the combination of a suitable mold, a hollow actuating-rod, intermediate rod, the upper end of which is adapted to enter and slide in the hole in the actuating-rod, a spring placed in the hole in the actuating-rod and adapted to press down upon the upper end of the intermediate rod, one or more plungers connected with the intermediate rod, a stop device for limiting the downward motion of the intermediate rod within the actuating-rod, and means for connecting the actuating-rod with the driving-shaft whereby the rod and plungers can be operated mechanically, substantially as set forth.

5. In a molding-press, the combination of a suitable mold, a hollow actuating-rod, an intermediate rod, the upper end of which is adapted to enter and slide in the hole in the actuating-rod, a spring placed in the hole in the actuating-rod and adapted to press down upon the upper end of the intermediate rod, means for regulating the tension of the spring, one or more plungers connected with the intermediate rod, a stop device for limiting the downward motion of the intermediate rod within the actuating-rod, and means for connecting the actuating-rod with the driving-shaft whereby the rod and plungers can be operated mechanically, substantially as set forth.

6. In a molding-press, the combination of a suitable mold, a hollow actuating-rod, an intermediate rod the upper end of which is adapted to enter and slide in the hole in the actuating-rod, a spring placed in the hole in the actuating-rod and adapted to press down upon the upper end of the intermediate rod, a compensating lever pivoted to the intermediate rod, plungers connected with the ends of the compensating lever, a stop device for limiting the downward motion of the intermediate rod within the actuating-rod, and means for connecting the actuating-rod with the driving-shaft, whereby the rod and plungers can be operated mechanically, substantially as set forth.

7. In a molding-press, the combination of a suitable mold, a hollow actuating-rod, an intermediate rod, the upper end of which is adapted to enter and slide in the hole in the actuating-rod, a spring placed in the hole in the actuating-rod and adapted to press down upon the upper end of the intermediate rod, one or more plungers connected with the intermediate rod, a stop device for limiting the downward motion of the intermediate rod within the actuating-rod, a follower connected with the actuating-rod, one or more springs interposed between the follower and the actuating-rod, and means for connecting the actuating-rod with the driving-shaft whereby the rod and plungers and follower can be operated mechanically, substantially as set forth.

8. In a molding-press, the combination of a suitable mold, a hollow actuating-rod, an intermediate rod the upper end of which is adapted to enter and slide in the hole in the actuating-rod, a spring placed in the hole in the actuating-rod and adapted to press down upon the upper end of the intermediate rod, a compensating lever pivoted to the intermediate rod, plungers connected with the ends of the compensating lever, a stop device for limiting the downward motion of the intermediate rod within the actuating-rod, a plate connected with the actuating-rod and provided with holes through which the follower-rods slide, follower-rods passing through said plate, a follower-plate fastened to the lower ends of the follower-rods, coiled springs around said follower-rods adapted to be pressed down by the upper plate and to press the follower-plate down, and a stop device against which the upper plate strikes so as to raise the follower-plate, and means for connecting the actuating device with the driving-shaft whereby the actuating-rod and plungers and follower-plate can be operated mechanically, substantially as set forth.

9. In a molding-press, the combination of a suitable mold, an actuating-rod, one or more plungers connected with the actuating-rod, a spring interposed between the plungers and the actuating-rod, a grooved cross-head connected with the actuating-rod, a disk for reciprocating the actuating-rod, a pin on said disk working in the groove of the cross-head, and a shaft carrying the disk and means for driving the shaft, substantially as set forth.

10. In a molding-press, the combination of a suitable mold, a hollow actuating-rod, an intermediate rod, the upper end of which is adapted to enter and slide in the hole in the actuating-rod, a spring placed in the hole in the actuating-rod and adapted to press down upon the upper end of the intermediate rod, one or more plungers connected with the intermediate rod, a stop device for limiting the downward motion of the intermediate rod within the actuating-rod, a grooved cross-head connected with the actuating-rod, a disk for reciprocating the actuating-rod, a pin on said disk working in the groove of the cross-head, and a shaft carrying the disk and means for driving the shaft, substantially as set forth.

11. In a molding-press, the combination of a suitable mold, a hollow actuating-rod, an intermediate rod the upper end of which is adapted to enter and slide in the hole in the actuating-rod, a spring placed in the hole in the actuating-rod and adapted to press down upon the upper end of the intermediate rod, a compensating lever pivoted to the intermediate rod, plungers connected with the ends of the compensating lever, a stop device for limiting the downward motion of the intermediate rod within the actuating-rod, a plate connected with the actuating-rod and provided with holes through which the follower-rods slide, follower-rods passing through said plate, a follower-plate fastened to the lower ends of the follower-rods, coiled springs around said follower-rods adapted to be pressed down by the upper plate and to press the follower-plate down, and a stop device against which the upper plate strikes so as to raise the follower-plate, a grooved cross-head connected with the actuating-rod, a disk for reciprocating the actuating-rod, a pin on said disk working in the groove of the cross-head, and a shaft carrying the disk and means for driving the shaft, substantially as set forth.

12. In a molding-press, the combination, substantially as set forth, of a suitable mold, the actuating-rod 7, provided with the slots 10, the intermediate rod 8, the pin 9 adapted to move in the slots 10, the spring 11, the nut 12 provided with the lug 15 adapted to project into a slot in the rod 7, the bolt 13, the nut 14, the compensating lever 16 pivoted to the rod 8, the plunger-rods 17 suitably connected with the compensating lever, plungers carried by the plunger-rods, the plate 20, the follower-rods 21, the follower-plate 22, followers carried by said plate, the springs 24, the collars 27, the grooved cross-head 28, the disk 30 provided with the pin 32, the shaft 31, and means for driving the shaft.

13. In a molding-press, the combination, substantially as set forth, of a revolving table, molds placed thereon at regulated distances, means for automatically revolving the table intermittently, means for automatically stopping the table at predetermined positions, plungers for properly molding the material and producing cavities or recesses to receive the screw-plungers, screw-plungers for molding a screw-thread in the cavities or recesses of the material, and means for inserting and removing the plungers.

14. In a molding-press, the combination, substantially as set forth, of a revolving table, molds placed thereon at regulated distances, means for automatically revolving the table intermittently, means for automatically stopping the table at predetermined positions, plungers for properly molding the material and producing cavities or recesses to receive the screw-plungers, screw-plungers for molding a screw-thread in the cavities or recesses of the material, means for inserting and removing the plungers, and means for automatically opening the molds when the material has been shaped.

15. In a molding-press, the combination, substantially as set forth, of a revolving table, molds placed thereon at regulated distances, means for automatically revolving the table intermittently, means for automatically stopping the table at predetermined positions, plungers for properly molding the material and producing cavities or recesses to receive the screw-plungers, screw-plungers for molding a screw-thread in the cavities or recesses of the material, means for inserting and removing the plungers, means for automatically opening the molds when the material has been shaped, and means for automatically closing the molds when the articles have been removed.

16. In a molding-press, the combination, substantially as set forth, of a revolving table, molds placed thereon at regulated distances, means for automatically revolving the table intermittently, means for automatically stopping the table at predetermined positions, an actuating-rod for inserting the screw-plungers in the molds, one or more screw-plungers adapted to be connected with the actuating-rod, a spring interposed between the plungers and the actuating-rod, means for connecting the actuating-rod with the driving-shaft, and one or more revolving spindles for removing the plungers.

17. In a molding-press, the combination, substantially as set forth, of a revolving table, molds placed thereon at regulated distances, means for automatically revolving the table intermittently, means for automatically stopping the table at predetermined positions, an actuating-rod for inserting the screw-plungers in the molds, one or more screw-plungers adapted to be connected with the actuating-rod, a spring interposed between the plungers and the actuating-rod, means for connecting the actuating-rod with the driving-shaft, and one or more revolving spindles for removing the plungers, and means for automatically opening and closing the molds.

18. In a molding-press, the combination, substantially as set forth, of a revolving table, molds placed thereon at regulated distances, means for automatically revolving the table intermittently, means for automatically stopping the table at predetermined positions, an actuating-rod provided with one or more plain plungers, a spring interposed between the plunger and the actuating-rod, an actuating-rod for inserting the screw-plungers in the molds, one or more screw-plungers adapted to be connected with the actuating-rod, a spring interposed between the plungers and the actuating-rod, means for connecting the actuating-rods with the driving-shaft, and one or more revolving spindles for removing the plungers.

19. In a molding-press, the combination, substantially as set forth, of a revolving table, molds placed thereon at regulated distances, means for automatically revolving the table intermittently, means for automatically stopping the table at predetermined positions, an actuating-rod for inserting the screw-plungers in the molds, one or more screw-plungers adapted to be connected with the actuating-rod, a spring interposed between the plungers and the actuating-rod, means for connecting the actuating-rod with the driving-shaft, one or more revolving spindles for removing the plungers, means for connecting the spindles with the driving-shaft so as to revolve the spindles continuously, and means for reciprocating the spindles.

20. In a molding-press, the combination of a suitable mold, an actuating-rod for inserting a screw-plunger in the mold, a screw-plunger adapted to be connected with the actuating-rod, a revolving spindle for removing the plunger from the mold, means for connecting the spindle with the driving-shaft so as to revolve the spindle continuously, and means for reciprocating the spindle.

21. In a molding-press, the combination of a revolving spindle, provided at its lower end with a catch adapted to engage with a screw-plunger, a gear-wheel feathered to the spindle so as to turn with the spindle but to permit the spindle to be reciprocated vertically therein, a shaft, a second gear-wheel on the shaft meshing with the first gear-wheel, and mechanism connecting the shaft with the driving-shaft of the press, substantially as set forth.

22. In a molding-press, the combination of a revolving spindle provided at its lower end with a catch adapted to engage with a screw-plunger, a gear-wheel feathered to the spindle so as to turn with the spindle but to permit the spindle to be reciprocated vertically therein, a shaft, a second gear-wheel on the shaft meshing with the first gear-wheel, two sleeves on said shaft turning loosely thereon, a gear-wheel attached to each sleeve, clutching mechanism whereby either one of said sleeves can be clutched to the shaft, a second shaft provided with gears meshing with the gears on the sleeves, and mechanism for driving the second shaft, whereby the speed of rotation of the spindles can be varied.

23. In a molding-press, having a central standard, the combination of a revolving spindle provided at its lower end with a catch adapted to engage with a screw-plunger, a gear-wheel feathered to the spindle so as to turn with the spindle but to permit the spindle to be reciprocated vertically therein, a shaft, a second gear-wheel on the shaft meshing with the first gear-wheel, an arm carrying the spindle and shaft and their connections and secured to the central standard so that it can be turned thereon, a second arm secured in like manner to the standard, a shaft carried in bearings in the second arm, a gear on the inner end of said shaft meshing with and adapted to ride upon a horizontal gear turning loosely on the standard, means for driving the horizontal gear, and means for connecting the two shafts, substantially as set forth.

24. In a molding-press, the combination of the spindles 70, 70, the levers 76, weights 73, gears 79, shaft 80, gears 81, sleeve 82, clutch 83, pulley 84, gear 85, sleeve 86, clutch 87, pulley 88, gear 89, rod 90, arms 91, means for moving the rod 90, the shaft 94, gears 95, 96, sprocket 97, chain 98, sprocket 99, shaft 100, arm 101, gears 102, 103, gear 104, shaft 38, and means for driving the shaft, substantially as set forth.

25. In a molding-press, the combination of a revolving spindle, and means for revolving and reciprocating the same, the dog 105 pivoted in a recess in the lower end of the spindle, having the tooth 106, and the lug 108 and the projection 111, the weight 109 provided with the slot 110, the lugs 112 on the spindle, and the screw-plunger 49 provided with the slot 107 and the grooves 113, substantially as set forth.

26. In a molding-press, the combination, substantially as set forth, of a revolving table, molds placed thereon at regulated distances, plungers for shaping the material, means for inserting and removing the plunger, a ratchet-wheel provided with teeth so spaced as to give the table the desired intermittent throw, a pawl adapted to engage with the ratchet-wheel and to rotate the table intermittently, means for connecting the ratchet-wheel with the table so that the table will revolve with the ratchet, a rod adapted to reciprocate in bearings in the press, a link connecting the rod with the pawl, and means for reciprocating the rod.

27. In a molding-press, the combination, substantially as set forth, of a revolving table, molds placed thereon at regulated distances, plungers for shaping the material, means for inserting and removing the plungers, a ratchet-wheel provided with teeth so spaced as to give the table the desired intermittent throw, a pawl adapted to engage with the ratchet-wheel and to rotate the same intermittently, means for connecting the ratchet-wheel with the table so that the table will revolve with the ratchet, a rod adapted to reciprocate in bearings in the press and provided with a cam-bearing, a link connecting the rod with the pawl, an operating-shaft, a cam on said shaft adapted to bear against the cam-bearing on the rod, and a spring adapted to press the rod in a direction against the cam.

28. In a molding-press, the combination, substantially as set forth, of a revolving table, molds placed thereon at regulated distances, plungers for shaping the material, means for inserting and removing the plungers, the rod 117 adapted to move in bearings in the machine, the link 119, plates 120, shaft 121, pawl 122, ratchet 123, spring 124, gears 125, gear 126 fastened to the table, cam-bearing 127, cam 128, spring 129, shaft 31 and means for revolving the shaft.

29. In a molding-press, the combination, substantially as set forth, of a revolving table provided with recesses at regulated distances, molds placed therein at regulated distances, plungers for properly molding the material and producing cavities or recesses to receive the screw-plungers, screw-plungers for molding a screw-thread in the cavities or recesses of the material, means for inserting and removing the plungers, means for automatically revolving the table intermittently, a dog adapted to enter one of the recesses in the table so as to stop the table at the proper position, and means for operating the dog.

30. In a molding-press, the combination, substantially as set forth, of a revolving table provided with recesses at regulated distances, molds placed thereon at regulated distances, plungers for shaping the material, means for inserting and removing the plungers, means for automatically revolving the table intermittently, a dog adapted to enter one of the recesses in the table so as to stop the table at the proper position, a rod adapted to reciprocate in bearings in the press, a bar connecting the rod with the dog, and means for reciprocating the rod.

31. In a molding-press, the combination, substantially as set forth, of a revolving table provided with recesses at regulated distances, molds placed thereon at regulated distances, plungers for shaping the material, means for inserting and removing the plungers, means for automatically revolving the table intermittently, a dog adapted to enter one of the recesses in the table so as to stop the table at the proper position, a rod adapted to reciprocate in bearings in the press and provided with a cam-bearing, a bar connecting the rod with the dog, an operating-shaft, a cam on said shaft adapted to bear against the cam bearing on the rod, and a spring adapted to press the rod in a direction against the cam.

32. In a molding-press, the combination, substantially as set forth, of a revolving table provided with recesses 139, molds placed thereon at regulated distances, plungers for shaping the material, means for inserting and removing the plungers, means for automatically revolving the table intermittently, the rod 117, adapted to move in bearings in the machine, the cam-bearing 127, cam 128, spring 129, bars 130, sleeve 131, dog 132, collar 135, spring 136, collar 137, shaft 31 and means for operating the shaft.

33. In a molding-press, the combination, substantially as set forth, of a revolving table provided with recesses at regulated distances, molds placed thereon at regulated distances, plungers for shaping the material, means for inserting and removing the plungers, a ratchet-wheel provided with teeth so spaced as to give the table the desired intermittent throw, a pawl adapted to engage with the ratchet-wheel and to rotate the same intermittently, means for connecting the ratchet-wheel with the table so that the table will revolve with the ratchet, a rod adapted to reciprocate in bearings in the press, a link connecting the rod with the pawl, a dog adapted to enter one of the recesses in the table so as to stop the table at the proper position, a bar connecting the rod with the dog, and means for reciprocating the rod.

34. In a molding-press, the combination, substantially as set forth, of a revolving table provided with recesses at regulated distances, molds placed thereon at regulated distances, plungers for shaping the material, means for inserting and removing the plungers, a ratchet-wheel provided with teeth so spaced as to give the table the desired intermittent throw, a pawl adapted to engage with the ratchet-wheel and to rotate the same intermittently, means for connecting the ratchet-wheel with the table so that the table will revolve with the ratchet, a rod adapted to reciprocate in bearings in the press, and provided with a cam-bearing, a link connecting the rod with the pawl, a dog adapted to enter one of the recesses in the table so as to stop the table at the proper position, a bar connecting the rod with the dog, an operating-shaft, a cam on said shaft adapted to bear against the cam-bearing on the rod and a spring adapted to press the rod in a direction against the cam.

35. In a molding-press, a mold consisting of a bottom piece, a rear jaw adapted to slide on the bottom piece and two front jaws pivoted at their outer ends to the rear jaw, and adapted to be locked in a closed position and to be unlocked and opened by being swung on their pivots, substantially as set forth.

36. In a molding-press, a mold consisting of a bottom piece, a rear jaw adapted to slide on the bottom piece, and two front jaws pivoted at their outer ends to the rear jaw, and means for turning the front jaws on their pivots so as to open them, and at the same time moving the rear jaw away from the articles in the mold, substantially as set forth.

37. In a molding-press, a mold consisting of a bottom piece, a rear jaw adapted to slide on the bottom piece, and two front jaws pivoted at their outer ends to the rear jaw, guiding-pins attached to the bottom piece, arms connected with the front jaws, and means for reciprocating the arms whereby when the arms are moved in one direction the front jaws are opened and the rear jaw moved back from its operative position, and when the arms are moved in the other direction the jaws are closed and brought into operative position.

38. In a molding-press, a mold consisting of a bottom piece, a rear jaw adapted to slide on the bottom piece, and two front jaws pivoted at their outer ends to the rear jaw, guiding-pins attached to the bottom piece, arms connected with the front jaws, a lever connected with the arms, a cam-roller on the lever, and cams for moving the lever whereby the mold is automatically opened and closed, substantially as set forth.

39. In a molding-press, the combination, substantially as set forth, of a revolving table, plungers for shaping the material, means for inserting and removing the plungers, the bottom piece 140 of a mold provided with recesses 141, the rear jaw 142, front jaws 143, arms 144, links 145, cross-head 146, rod 147, block 148, link 149, lever 150, cam-roller 151, guide-pins 152, cam 156 and means for supporting it in place, cam 161 and means for supporting it in place.

40. In a molding-press the combination substantially as set forth, of a revolving table, molds placed thereon at regulated distances, means for automatically revolving the table intermittently, means for automatically stopping the table at predetermined positions, plungers for properly molding the material and producing a screw-thread therein and means for inserting and removing the plungers.

In testimony whereof we have signed our names to this specification in the presence of two subscribing witnesses.

HENRY M. BROOKFIELD.
    SERAPHIN KRIBS.

Witnesses:
 TIMOTHY E. RAFTERY,
 EDWIN SEGER.